United States Patent [19]
Allwine

[11] Patent Number: 6,124,709
[45] Date of Patent: Sep. 26, 2000

[54] MAGNETIC POSITION SENSOR HAVING A VARIABLE WIDTH MAGNET MOUNTED INTO A ROTATING DISK AND A HALL EFFECT SENSOR

[75] Inventor: Elmer C. Allwine, Santa Clara, Calif.

[73] Assignee: CTS Corporation, Elkhart, Ind.

[21] Appl. No.: 09/092,782

[22] Filed: Jun. 5, 1998

[51] Int. Cl.[7] .................................................... G01B 7/30
[52] U.S. Cl. .............................. 324/207.2; 324/207.21; 324/207.25; 324/207.22
[58] Field of Search ........................... 324/207.2, 207.21, 324/207.22, 207.23, 207.24, 207.25, 207.26, 251, 260, 262; 338/32 R, 32 H

[56] References Cited

U.S. PATENT DOCUMENTS

| | | | |
|---|---|---|---|
| 3,112,464 | 11/1963 | Ratajski et al. | |
| 4,142,153 | 2/1979 | Smith | 324/165 |
| 4,293,837 | 10/1981 | Jaffe et al. | 338/32 H |
| 4,570,118 | 2/1986 | Tomczak et al. | 324/207.2 |
| 4,726,338 | 2/1988 | Decker et al. | 123/414 |
| 4,744,343 | 5/1988 | Bisenius et al. | 123/476 |
| 4,848,298 | 7/1989 | Schleupen | 123/414 |
| 4,942,394 | 7/1990 | Gasiunas | 340/870.31 |
| 5,055,781 | 10/1991 | Sakakibara et al. | 324/207.21 |
| 5,115,239 | 5/1992 | Ushiyama | 340/870.31 |
| 5,159,268 | 10/1992 | Wu | 324/207.2 |
| 5,258,735 | 11/1993 | Allwine, Jr. | 335/306 |
| 5,313,159 | 5/1994 | Allwine, Jr. | 324/207.2 |
| 5,712,561 | 1/1998 | McCurley et al. | 324/207.2 |

Primary Examiner—Jay Patidar
Attorney, Agent, or Firm—Mark P. Bourgeois

[57] ABSTRACT

A linear analog rotary 360 degree magnetic position sensor assembly for sensing the position of rotating objects. A magnet having a varying width is mounted to a magnet disc. A flux return disc is mounted on a shaft opposed to the magnet disc. The magnet generates a magnetic field in an air gap between the discs. A magnetic field sensor such as a hall effect sensor is positioned in the gap and operates to provide an output signal representative of the magnetic field density as the shaft and disc rotate. The output signal changes magnitude in relation to the relative position of the magnet with respect to the magnetic field sensor.

19 Claims, 5 Drawing Sheets

MAGNETIC POSITION SENSOR HAVING A VARIABLE WIDTH MAGNET MOUNTED INTO A ROTATING DISK AND A HALL EFFECT SENSOR

BACKGROUND OF THE PREFERRED EMBODIMENT(S)

1. Field of the Preferred Embodiment(s)

This invention generally relates to position sensing and to a position sensor which is compact, durable and precise. More specifically, the invention relates to a non-contacting 360 degree position sensor.

2. Description of the Related Art

Position sensing is used to allow an electrical circuit to gain information about an event or a continuously varying condition. There are a variety of known techniques for angular position sensing. For example, optical, electrical, electrostatic, and magnetic fields are all used in a sensor to measure position. There are many known sensors such as resistive contacting networks, inductively coupled ratio sensors, variable reluctance devices, capacitively coupled ratio detectors, optical detectors using the Faraday effect, photo-activated ratio detectors, and electrostatic ratio detectors.

There are many applications for sensors, and a wide variety of technologies to fill these needs. Each of these technologies offers a unique set of advantages and limitations. Of these technologies, magnetic sensing is known to have a unique combination of long life components and excellent resistance to contaminants.

Regardless of the arrangement and method for changing the field about the sensor, the magnetic circuit faces several obstacles which have not been overcome. Movement of the sensor relative to the gap as a result of bearing play will lead to a variation in field strength measured by the sensor. This effect is particularly pronounced in Hall effect, magnetoresistive and other similar sensors, where the sensor is sensitive about a single axis and insensitive to another axis magnetic field.

Another problem with the prior art magnetic sensors is that eddy current effects occur when a magnet is held stationary with respect to a rotating ferromagnetic material. For example, in a variable reluctance sensor for a crankshaft sensor, a stationary magnet is located near the rotating teeth of a steel gear. The eddy current effects cause the signal strength generated by the sensor to be reduced.

Description of Related Art

Examples of patents related to the present invention are as follows, wherein each patent is herein incorporated by reference for related and supporting teachings:

U.S. Pat. No. 3,112,464 is a hall effect translating device.

U.S. Pat. No. 4,142,153 is a tachometer for measuring speed and direction of shaft rotation with a single sensing element.

U.S. Pat. No. 4,293,837 is a hall effect potentiometer.

U.S. Pat. No. 4,570,118, is an angular position transducer including permanent magnets and hall effect device.

U.S. Pat. No. 4,726,338 is a device for controlling internal combustion engines.

U.S. Pat. No. 4,744,343 is a device for controlling an internal combustion engine.

U.S. Pat. No. 4,848,298 is a device for controlling internal combustion engine.

U.S. Pat. No. 4,942,394 is a hall effect encoder apparatus.

U.S. Pat. No. 5,055,781, is a rotational angle detecting sensor having a plurality of magnetoresistive elements located in a uniform magnetic field.

U.S. Pat. No. 5,115,239 is a magnetic absolute position encoder with an undulating track.

U.S. Pat. No. 5,159,268 is a rotational position sensor with a hall effect device and shaped magnet.

U.S. Pat. No. 5,258,735 is a multi-pole composite magnet used in a magnetic encoder.

U.S. Pat. No. 5,313,159 is a magnetic encoder with composite magnet.

U.S. Pat. No. 5,712,561 is a field strength position sensor with improved bearing tolerance in a reduced space.

The foregoing patents reflect the state of the art of which the applicant is aware and are tendered with the view toward discharging applicants' acknowledged duty of candor in disclosing information that may be pertinent in the examination of this application.

Problems with the Prior Art

There are several problems that exist with the prior art that are addressed by the preferred embodiment. One problem with magnetic position sensors is how to provide a continuous output signal representative of the angular position of a continuously rotating object. Prior art sensors used individual magnets arrayed around a rotating object to give an indication of several individual discrete angular positions. For example, a rotating gear using symmetrically spaced teeth which rotate near a fixed magnet as in a variable reluctance sensor. Another prior art technique which has the same problem is an optical comparator which decodes the position of symmetrically spaced slots on a rotating disk.

Another problem is that the prior art sensor outputs have not been linear. In many control applications, it is necessary to have a linear output to provide the precise control needed in many applications. The prior art sensors have been single point detectors and/or accumulators.

This and other problems will be solved by the preferred embodiments of the invention. A review of the specification, drawings, and claims will more clearly teach a skilled artisan of other problems that are solved by the preferred embodiments.

SUMMARY OF THE PREFERRED EMBODIMENT(S)

It is a feature of the invention to provide a linear analog rotary 360 degree magnetic position sensor assembly for sensing the position of rotating objects. Specifically, there is a magnetic field generating means rotating about a first axis to generate a magnetic field of variable flux density from 0 to 360 degrees. A flux linkage means rotates about the first axis and is coaxial with the magnetic field generating means. The flux linkage means is spaced from the magnetic field generating means so as to define an air gap therebetween. The air gap conducts a magnetic flux from the magnetic field generating means to the flux linkage means. A magnetic field sensor is positioned in the air gap and operates to provide an output signal representative of the field strength of the magnetic flux as the magnetic field generating means and the flux linkage means are rotated. The output signal changes magnitude in relation to the relative position of the magnetic field generating means with respect to the magnetic field sensor.

It is a feature of the invention to provide the output signal having a sawtooth pattern.

It is a feature of the invention to provide the magnetic field generating means as a permanent magnet mounted into a groove on a flat ferromagnetic disc. The magnet has a generally circular shape and a non-symmetrical width.

A further feature of the invention is to provide the magnet with a width that is characterized as having a generally narrow region which gradually increases in width and seamlessly abuts to a generally wide region. The wide region has an end which rapidly decreases in width and seamlessly abuts the narrow region.

Another feature of the invention is to provide a shaft adapted to be connected to a rotatable object spaced from a housing and the sensor.

Another feature of the invention is to provide a magnetic sensor in which the ferromagnetic or magnetizable material rotates at the same speed as the magnet so that eddy current effects are minimized or eliminated.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawings as follows.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
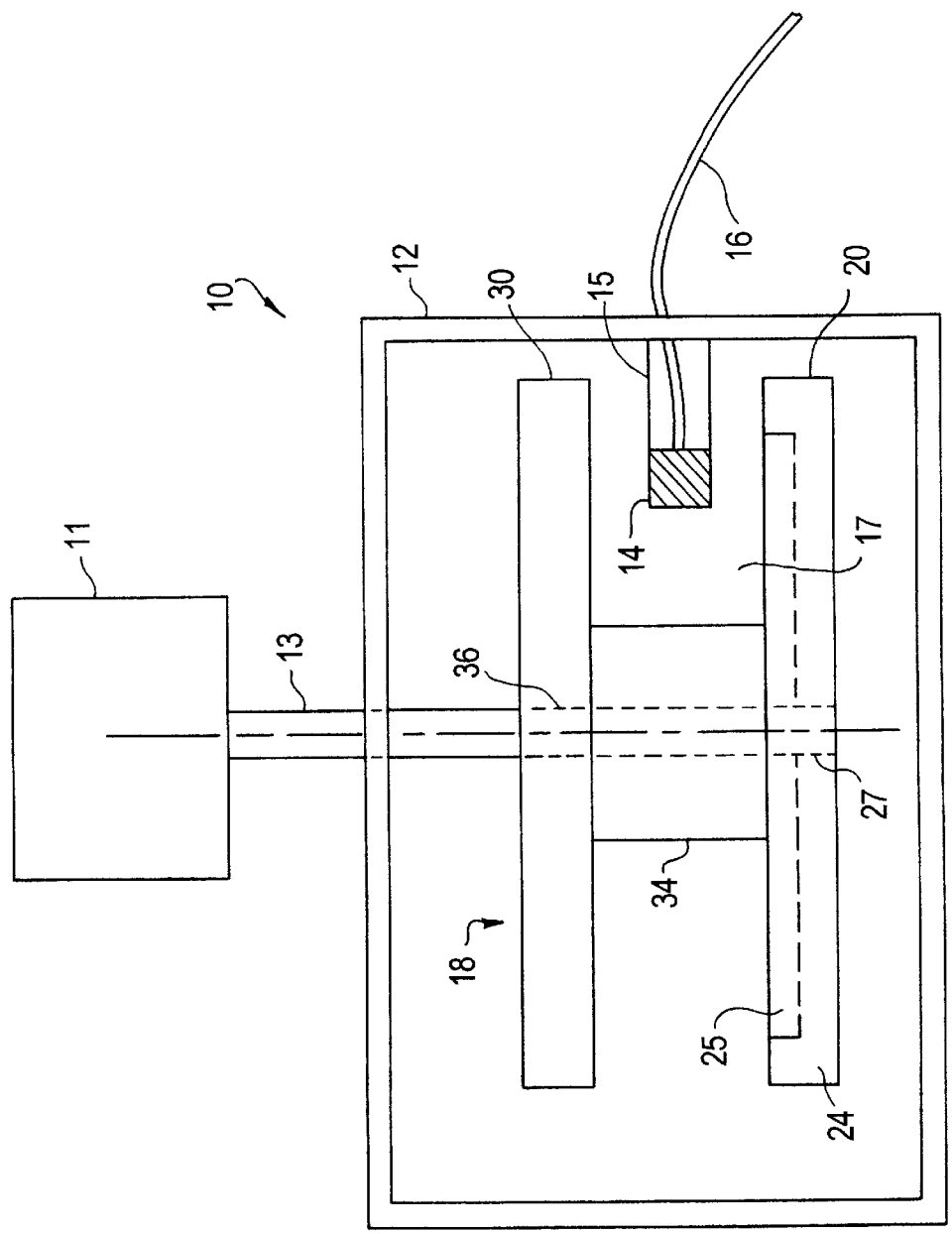
FIG. 1 is a side view of the preferred embodiment with a side of the housing removed.

Referring to FIG. 1, there is a side view of the preferred embodiment 10 with a side of housing 12 removed. Specifically, there is a linear output analog rotary magnetic position sensor assembly 10. The assembly 10 has a housing 12 for containing the sensor assembly 10. A shaft 13 projects through housing 12 and is supported by a rotating support means (not shown) such as a bearing. A magnetic field sensor 14 is shown mounted to a sensor support or holder 15. Magnetic field sensor 14 is typically a conventional hall effect sensor such as a Siemens model KSY144. A wire or electrical connection 16 connects the magnetic sensor 14 to external circuitry (not shown). The sensor 14 provides an output signal that the external circuitry receives for processing. The shaft 13 is adapted to be connected to another rotating object 11 such as a motor shaft, a crankshaft or a throttle body on a fuel injection system that is spaced from the housing 12 so that the shaft 13 rotates at the same rate as the rotating object 11. The shaft 13 rotates about an axis of rotation 19.

Contained within housing 12 is a magnetically permeable pole assembly or piece 18. Pole assembly 18 has a flux return disc or piece 30 with a hub or flange 34. Flange 34 is preferably formed as a single part or welded or screwed to disc 30. Flux return disc 30 is positioned spaced parallel to and opposed to a magnet disc 20. Magnet part or piece or disc 20 and flux return disc 30 are preferably formed out of a conventional low carbon steel such as 1018 cold rolled or ancor steel. The discs could be molded out of powdered metal. The discs 20 and 30 are formed of a uniform thickness. Magnet disc 20 has a shaft hole 27 passing therethrough and 30 and flange 34 have a shaft hole 36 passing therethrough. Shaft 13 along with fasteners (not shown) connect disc 20, disc 30 and flange 34 together. An air gap 17 is shown located between disc 20 and disc 30. The magnetic field sensor 14 is mounted in the air gap 17 and is spaced equidistant from discs 20 and 30. The length of the flange 34 determines the size of the air gap 17.

Figure 2:
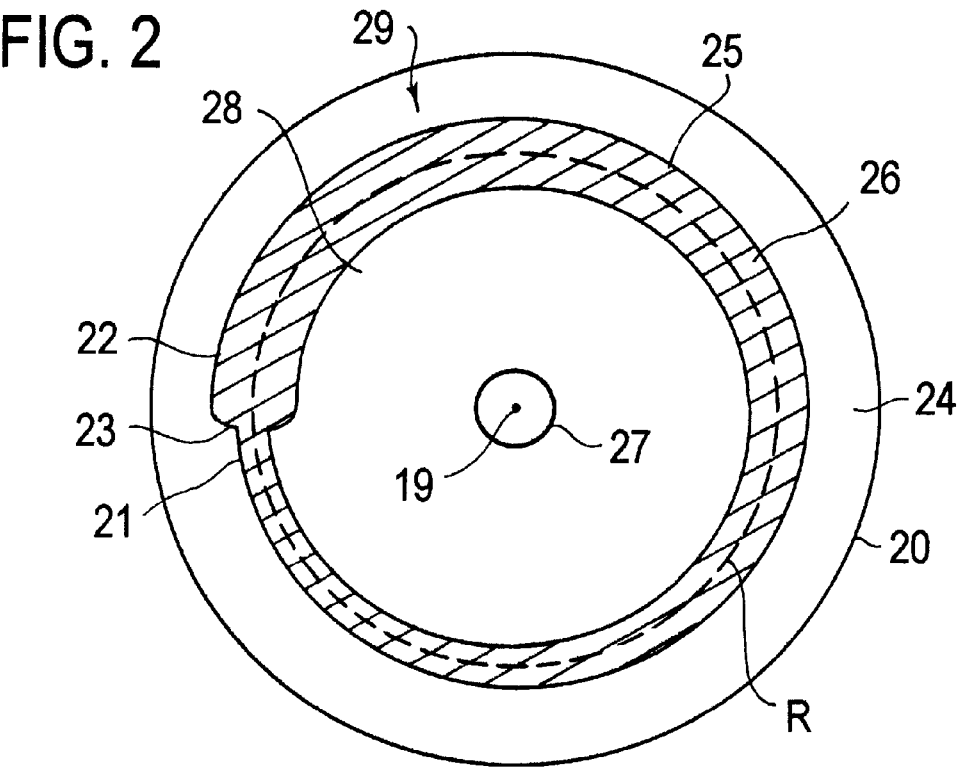
FIG. 2 is a top view of the lower disc containing the magnet from FIG. 1.

Referring to FIG. 2, a top view of the disc 20 containing the magnet is shown. The magnet 26 is shown embedded into a groove 25 (best seen in FIG. 1). The magnet 26 is formed in a generally circular or ring shape, has a uniform thickness and has a width that varies about a circle of constant radius R on the disc 20. The magnet 26 has a narrow point or region 21 from which the width of the magnet 26 gradually increases moving counterclockwise. The width increases moving counter clock wise about the circle of constant radius R until it forms a wide point or region 22. Continuing to move counterclockwise, the magnet 26 has a transition zone or region 23. In transition region 23, the width of the magnet 26 decreases rapidly down to the narrow region 21 width. The magnet 26 is placed approximately to be centered on the magnet disc surface 29 dividing it into a magnet disc outer surface or region 24 and a magnet disc inner surface or region 28. The magnet 26 is preferably manufactured out of a conventional magnetic material such as Barium Ferrite commercially available from Arnold Engineering, Norfolk, Nebr.

Figure 3:
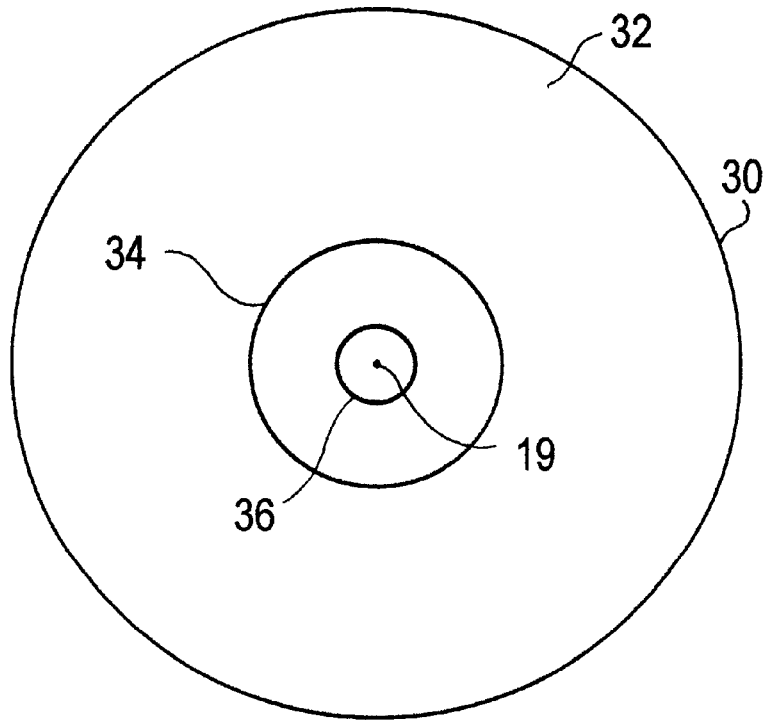
FIG. 3 is a bottom view of the upper disc from FIG. 1.

Referring to FIG. 3, a bottom view of flux return disc 30 is shown. Flux return disc 30 has a surface 32 that opposes magnetic disc surface 29, a flange 34 that spaces the disc 20 from disc 30 and a shaft hole 36 that receives shaft 13.

Figure 4:
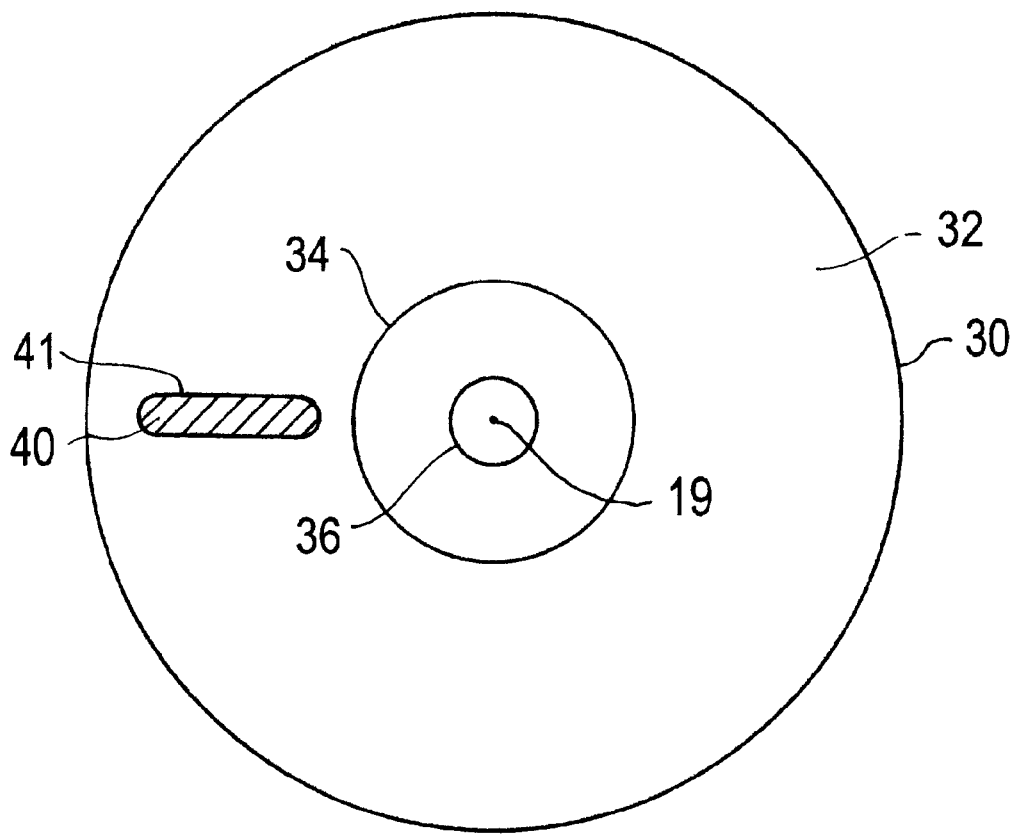
FIG. 4 is a bottom view an alternative embodiment of the upper disc.

Referring to FIG. 4, a bottom view of an alternative embodiment of the flux return disc is shown. The flux return disc 30 has a generally oval transition region magnet 40 oriented lengthwise along a radial line from axis 19 of disc 30. The transition region magnet 40 is located in a groove 41 in disc 30 so that the top surface of magnet 40 is at the same height as the surface 32. The transition region magnet 40 and disc 30, when assembled with disc 20, is located above the transition region 23 of disc 20. The transition region magnet 40 is made out of the same magnetic material as magnet 26.

The linear analog rotary magnetic position sensor assembly 10 is assembled as follows: The first step is to place magnet 26 into the groove 25. The magnet 26 is preferably is bonded in place with glue or epoxy; however, this is not necessary as the magnetic forces from magnet 26 are sufficient to hold the magnet 26 in place. The second step is to form the pole assembly 18. The magnet disc 20, the flange 34 and the flux return disc 30 are attached to shaft 13 using a fastener (not shown). The fastener is typically screws; However, a press fit or a tapered shaft or a keyed shaft or set screws could be used. The third step is to place the sensor 14 onto the sensor support 15. The fourth step is to attach the wire 16 to the sensor 14. The fifth step is to place the pole assembly in the housing 12 such that the shaft 13 extends through an opening in the housing (not shown). The sixth step is to attach the sensor 14 and sensor support 15 to the housing 12. The seventh and final step is to place a cover (not shown) to complete the housing 12.

Operation of the Preferred Embodiment

The operation of the linear analog rotary magnetic position sensor assembly 10 is described next. As the shaft 13 is rotated by the rotating object whose position is desired to be sensed, the magnet 26 will rotate relative to the sensor 14. A closed magnetic path exists when generated flux is confined within a high permeability material such as found in sensor assembly 10. Specifically, the flux path from magnet 26 primarily flows from the magnet 26, through the air gap 17, through disc 30, down flange 34, and into disc 20 to complete the flux path. As the magnet 26 rotates, the magnetic field density sensed by sensor 14 will change due to the changing width of the magnet 26. When the magnet narrow region 21 is positioned next to the sensor 14, the magnetic field will have a relatively low density and the output from sensor 14 will be low. As the magnet 26 rotates, a wider portion of magnet 26 is located next to the sensor 14 and the magnetic field density increases proportionally due to the increasing width of the magnet 26. When the magnet wide region 22 is positioned next to the sensor 14, the magnetic field will have a relatively high density and the output from sensor 14 will be correspondingly high. When the magnet transition region 23 is reached, the magnetic field density will rapidly fall back to the relatively low density of the narrow region 21 and the output from sensor 14 will change proportionately.

Figure 5:
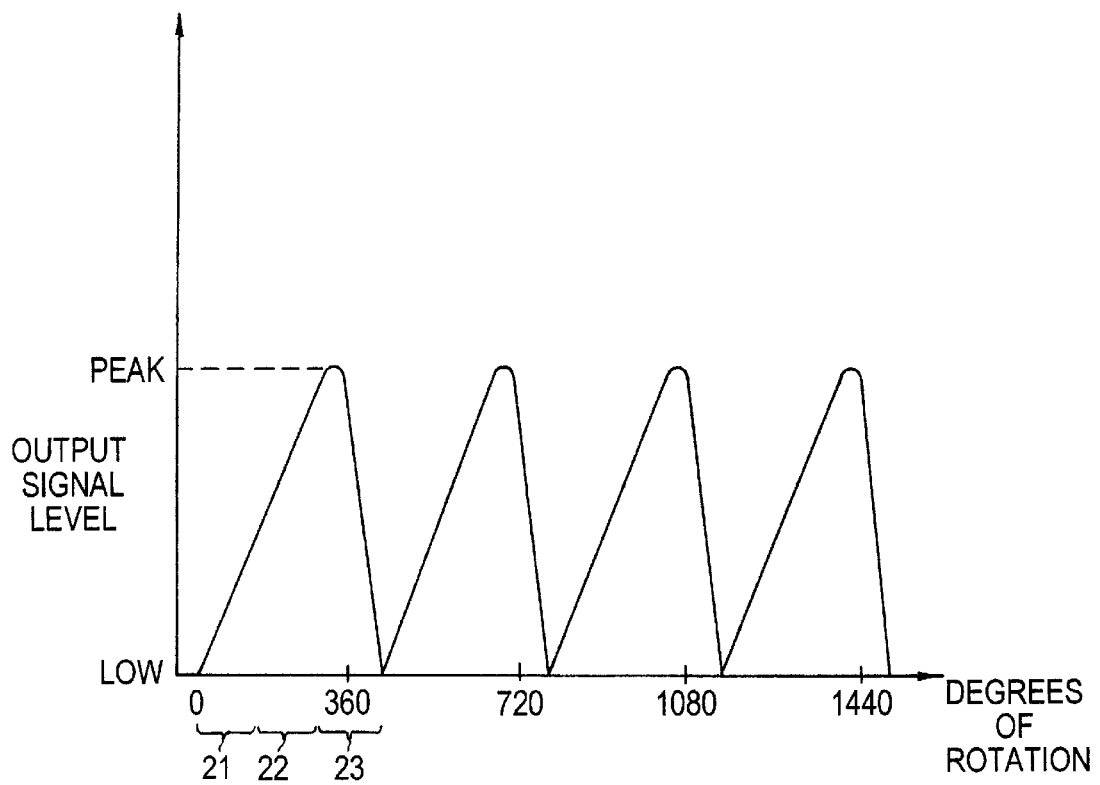
FIG. 5 is a graph of the output signal level versus degrees of rotation of the pole assembly using the upper disc of FIG. 3.

Referring to FIG. 5, a graph of the magnitude of the output signal level versus degrees of rotation of the pole assembly 18 is shown using the upper disc 30 of FIG. 3. The electrical output signal from sensor 14, when observed over time, will have a generally sawtooth shape. It is understood that the output from sensor 14 will be connected to conventional signal processing electronics for amplification, filtering etc. The output signal rises generally linearly as the magnet 26 rotates from the narrow region 21 to the magnet wide region 22, i.e. from 0 to 360 degrees of rotation. The output signal has a peak magnitude which occurs at the widest point in the wide region 22. At the transition region 23, the output signal rapidly drops to a low level resulting in the sawtooth shape. The cycle then repeats for the next rotations from 360 to 720 degrees, then from 720 to 1080 degrees and so on.

It has been found that the electrical output signal representative of the transition region 23 can have a rounded peak as shown in FIG. 5. The flux in the transition region 23 tends to lean or elbow from the higher density region 22 to the lower density region 21. This causes the rounded peaks shown in FIG. 5. The rounded output signal makes it more difficult to resolve precise angular positions of the shaft in the transition region.

Figure 6:
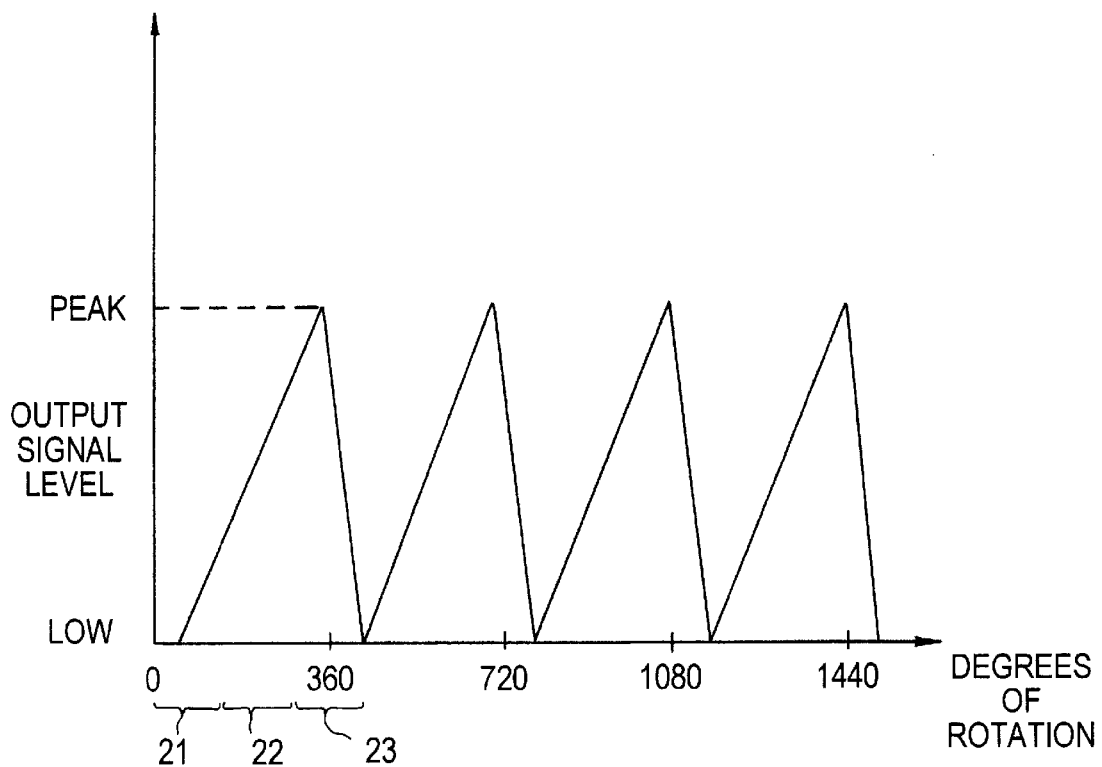
FIG. 6 is a graph of the output signal level versus degrees of rotation of the pole assembly using the upper disc of FIG. 4.

The alternative embodiment shown in FIG. 4 has been designed to provide a more sharper triangular shaped signal in the transition region 23 which leads to more precise angular position resolution. The transition region magnet 40 and disc 30 when assembled with disc 20 is located above the transition region 23 of disc 20. The transition region magnet 40 directs or aligns the flux in the transition region 23 from the denser region of flux (wide region 22) to the less dense region of flux (narrow region 21). This results in a sharper more triangular shaped peak output signal. FIG. 6 shows a graph of the magnitude of the output signal level versus degrees of rotation of the pole assembly 18 shown using the upper disc 30 with the transition region magnet 40. In FIG. 6, the peak of the signal waveform has a sharper peak than that shown in FIG. 5.

Remarks about the Preferred Embodiment

One of ordinary skill in the arts of sensors, and more particularly the art of designing non-contacting position sensors, will realize many advantages from using the preferred embodiment. In particular, the linear analog rotary magnetic position sensor assembly allows the continuous position sensing of a continuously rotating object using a variable magnetic field.

Additionally, a skilled artisan will understand that the use of the uniform thickness discs 20 and 30 and magnet 26 allows the rotary position sensor to be fabricated in a small size and economically manufactured.

It is understood that there are magnetic losses in any magnetic path from fringing flux and other loss sources.

The rotation of the magnet simultaneously with the pole assembly allows for the elimination of eddy current and their unwanted effects.

Variations of the Preferred Embodiment(s)

One of ordinary skill in the art of making position sensors will realize that there are many different ways of accomplishing the preferred embodiment. For example, it is contemplated to make the housing 12, out of any suitable material, like plastics, epoxy resin, fiberglass etc. If desired, the housing could be omitted and the elements of the invention attached to other support structures. Additionally, the pole assembly 18 could be made out of any magnetically permeable material such as cast iron. The pole assembly 18 could be fastened by other methods such as glue, press fitting, welding etc.

Even though, the embodiment discusses the use of one magnet 26, it is contemplated to use two or more magnets 26 and two or more sensors 14.

Similarly, even though the embodiment discusses the use of a Barium Ferrite magnet 26, one skilled in the art of magnet design would realize that a Samarium Cobalt magnet could also be used. It is also possible to make the shape of the magnet 26 differently. For example, the magnet 26 could be made narrower or wider than what is shown. The magnet 26 also could be formed from many small magnets that are arrayed having an increasing or decreasing length or width.

Although, the magnet 26 is illustrated as being mounted flush in groove 25, it is contemplated to place the magnet 26 on the surface of magnet disc 20 without being positioned in the groove 25.

Even though the magnet is shown mounted on the bottom disc 20, the discs could be reversed with disc 20 on the top and disc 30 on the bottom.

Additionally, although it is illustrated that the magnet 26 is mounted in groove 25 flush with the surface of disc 20, it is contemplated to place the magnet 26 with a variable width on an end or edge of the magnet disc 20 and to form the non-magnet disc 30 as a cutoff hollow cylinder with the magnet disc 20 mounted therein. The sensor would be located between the disc edge and the cutoff hollow cylinder.

The sensor shown in the preferred embodiment was a hall effect sensor. Other sensors could be utilized such as magnetoresistive sensors or other types of magnetic sensors.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A rotary position sensor, comprising:
    a) a magnetically permeable pole assembly having an air gap, the pole assembly including:
        a1) a first disc:
        a2) a second disc having a groove and a magnet mounted in the groove; and
        a3) a flange connecting the first and second discs, the flange located between the first and second discs, the flange magnetically coupling the first and second discs, the first and second discs spaced apart and thus defining the airgap therebetween, the first and second discs having a common axis of rotation;
    b) the magnet providing a magnetic path through the magnet, the airgap, the first disc, the flange and the second disc, the magnet having a generally circular shape and varying in width about a circumference, the magnet providing a variable magnetic field about the circumference; and
    c) a magnetic field sensor positioned in the air gap and operable to provide an output signal representative of the relative position of the magnet with respect to the magnetic field sensor as the magnet rotates.

2. The position sensor according to claim 1, wherein the magnetically permeable pole assembly is continuously rotatable through 360 degrees.

3. The position sensor according to claim 1, wherein the first disc and second disc are spaced apart equidistant about the entire circumference of the first and second disc such that the dimension of the air gap is uniform.

4. The position sensor according to claim 1, wherein the magnetic field sensor is aligned perpendicular to the magnetic field during rotation of the pole assembly about the axis of rotation.

5. The position sensor according to claim 1, wherein the pole assembly and the magnet simultaneously rotate at the same speed such that eddy current effects are eliminated.

6. The position sensor according to claim 1, wherein the magnet has a width that is characterized as having a generally narrow region which gradually increases in width and seamlessly abuts to a generally wide region, the wide region having an end which rapidly decreases in width and seamlessly abuts the narrow region.

7. The position sensor according to claim 6, wherein the groove has the same dimensions as the magnet.

8. The position sensor according to claim 1, wherein the magnet has a circumference characterized in that a circumferential cross-section of the magnet varies from having a narrow width along a first part of said circumference and increasing in width to a wider width along a second part of said circumference, the wider width decreasing in width to the narrow width along a third part of said circumference, the magnet further having a uniform thickness.

9. The position sensor according to claim 8, wherein the first disc has a transistion region magnet mounted therein, the transistion region magnet facing the air gap and aligned opposed to the magnet circumference third part.

10. A position sensor for sensing rotation of a device about a first axis, comprising:
    a) a circular magnet that has a uniform thickness and a variable width that increases from a first to a second point on the magnet, and has a transition zone where the second point width rapidly transitions to the first point width, the variable width magnet operable to generate a variable magnetic field;
    b) a pole assembly, having a, magnet disc, a flux return disc and a hub for retaining the first and second pieces in parallel and opposing relationship, the magnet disc having a groove into which the circular magnet is mounted;
    c) an airgap defined between the magnet disc and the flux return disc; and
    d) a magnetic field sensor positioned in the air gap and operable to provide an output signal representative of the variable magnetic field as the pole assembly is rotated, the output signal changing magnitude in relation to the relative position of the magnet with respect to the magnetic field sensor.

11. The position sensor according to claim 10, wherein the first disc has a transistion region magnet mounted therein, the transistion region magnet facing the air gap and aligned opposed to the transition region.

12. The position sensor according to claim 10, wherein the output signal has a sawtooth pattern.

13. The position sensor according to claim 10, wherein the magnet disc and the flux return disc are spaced apart equidistant about the entire circumference of the first and second discs such that the dimension of air gap is uniform.

14. The position sensor according to claim 10, further comprising:
    a shaft connected to the flux return disc and adapted to be connected to a rotatable object spaced from the position sensor.

15. A rotary position sensor for attachment to a rotating object whose position is desired to be sensed, comprising:
    a) a magnetically permeable pole assembly having a first and second opposed discs, the discs held apart by a flange located between the discs, the pole assembly attached to the rotating object;
    b) a groove disposed in the second disc;
    c) a magnet mounted in the groove, the magnet having a variable width about a circumference of the magnet, the magnet providing a variable magnetic field about the circumference;
    d) a transistion region magnet mounted in the first disc, the transistion region magnet facing an air gap;
    e) the air gap defined between the first and second discs; and
    f) a magnetic field sensor positioned in the air gap for providing a variable electrical output signal representative of the relative position of the magnet with respect to the magnetic field sensor as the magnet rotates.

16. The rotary position sensor according to claim 15, wherein the magnet has a uniform thickness and the variable width about the circumference of the magnet changes from a narrow region to a wide region and then to a transition region where the magnet width rapidly transitions from wide region to the narrow region.

17. The position sensor according to claim 16, wherein the transition region magnet is aligned opposite to the transistion region.

18. The position sensor according to claim 17, wherein the electrical output signal that is generated has a sawtooth pattern as the magnet rotates.

19. The position sensor according to claim 18, wherein the transistion region magnet provides the sawtooth pattern electrical output signal with a sharper triangular shape.

* * * * *